Figure 1:
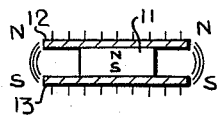

Oct. 7, 1952     H. SPODIG     2,613,246

MAGNETIC SYSTEM

Filed May 4, 1950

INVENTOR.
HEINRICH SPODIG

BY

ATTORNEY

Patented Oct. 7, 1952

2,613,246

UNITED STATES PATENT OFFICE 2,613,246

MAGNETIC SYSTEM

Heinrich Spodig, Dortmund-Wambel, Germany

Application May 4, 1950, Serial No. 159,919
In Germany October 1, 1948

7 Claims. (Cl. 175—21)

This invention relates generally to magnetic systems, and particularly relates to a magnetic system including a permanent magnet for attracting and collecting magnetizable particles.

Magnetic systems of the permanent magnet type are known; they are used for separating, attracting and filtering ferromagnetic solid particles from easily movable solids such as granular materials and the like, or from fluids such as gaseous or vaporous media or liquids, particularly machine oil or lubricating oil. Such filters are provided for example in a suitable portion of the pressure conduit, or of the return conduit of the oil such as a lubricating oil circulating through a metal working machine. The filter is used to attract the dust, filings or metal particles which are produced by the working of the metal. In view of the abrasive effect of such metallic particles they frequently cause extensive damage of sliding surfaces or other relatively movable machine parts to be lubricated. It is also customary to attach such filters to the walls of the gear housing of automobiles and machines to lubricating oil tubs, crank cases and the like to remove for the same reasons abrasive particles from the oil. Most magnets and magnetic filters of the prior art are inefficient and are used but rarely in view of their inherent disadvantages although the need of such filters for these purposes is generally recognized.

Thus it has been proposed to provide a simple rod or horse shoe magnet which projects into the medium to be cleaned. The ferromagnetic particles are attracted to the poles of the magnet like a beard, and these accumulations are easily removed by the medium flowing past the magnet pole. Thus the particles are swept again into the medium and since they are now magnetized they cling together and cause still greater destruction in the machine.

For the same purpose it has been proposed to use magnet systems comprising permanent magnets and ferromagnetic soft iron pieces having an air gap across which a magnetic field is developed. However, the action of a magnetic field developed in such an air gap is comparatively weak so that only few ferromagnetic particles can be collected in the comparatively small space of the air gap. Furthermore, stray magnetic fields are formed even outside the air gap which will attract ferromagnetic particles that will assume a bulge-like shape. The stray magnetic fields which are farthest removed from the air gap will only weakly attract the particles. In this case the ferromagnetic accumulations of filtered particles which project into the flowing medium (such as circulating lubricating oil) are swept again into the medium as a conglomeration of particles which then again exercise their detrimental action. Besides these detrimental drawbacks most of the known magnet systems have uncontrollable magnetic stray fields originating from various places of their surfaces. These stray fields will also attract ferromagnetic particles which get again into the circulating fluid so that they will cause further damage.

It is accordingly an object of the invention to provide an improved magnet system for attracting and removing ferromagnetic particles from a fluid such as oil which avoids one or more of the disadvantages of the prior art.

A further object of the invention is to provide a permanent magnet system for the purposes specified which has a great attraction for ferromagnetic particles and which will substantially prevent that such particles are washed away again by the medium to be cleaned.

Another object of the invention is to provide a magnet system which has substantially no uncontrollable stray magnetic fields and which has a space suitable for collecting a large number of ferromagnetic particles.

Figure 5:
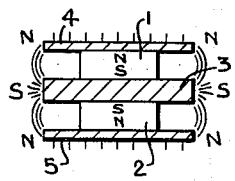
Figure 6:
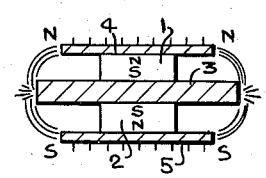
Figure 7:
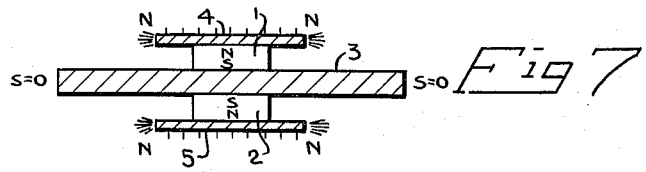

These and other objects of the invention will be better understood as the description proceeds, taken in connection with the accompanying drawing, in which Figs. 1 to 4 are cross-sectional views of permanent magnets which have the drawbacks described hereinbefore;

Figs. 5 to 7 are cross-sectional views of permanent magnet systems which illustrate a novel magnetic effect on which the present invention is based; and Figs. 8 to 15 are cross-sectional views of permanent magnet systems embodying the present invention.

Figure 2:
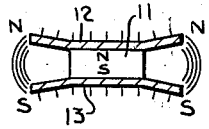
Figure 3:
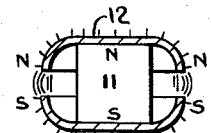
Figure 4:
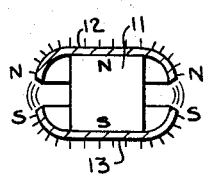

Referring to the drawing, there is shown in Fig. 1 a rod-shaped permanent magnet 11 having a north pole N and a south pole S. A pair of ferromagnetic soft iron plates or pole pieces 13 and 12, which may be of circular shape and are disposed about the poles of the magnet. Consequently, a magnetic field is developed having an N pole and an S pole on the plates 12 and 13 as indicated in the air gap formed by the plates 12 and 13. The soft iron plates 12 and 13 may also have a rectangular or oval outline or they may each have the shape of a hollow semi-sphere as shown in Fig. 3. Alternatively, in order to vary the magnetic stray effect and to provide for a larger volume for collecting ferromagnetic particles the air gap formed by the edges of the plates 12 and 13 may be widened or outwardly flared as illustrated in Figs. 2 and 4.

However, the magnetic effect of the magnets of Figs. 1 to 4 is the same. The magnetic field is only effective at the outer edge of the magnet system and has all the detrimental effects already described in view of the detrimental stray effect of the air gap. These filters have not been described heretofore but it is believed that their mode of operation is well understood in view of the present state of the art. These magnets further show uncontrollable magnetic stray fields at the surface of the magnet (indicated in the drawing) which increase their detrimental effect.

Fig. 5 illustrates a magnet system including two permanent magnets 1 and 2. A soft iron intermediate plate 3 is disposed between the magnets 1 and 2 and a pair of outer soft iron plates 4 and 5 cover the free poles of the magnets. Plates 3, 4 and 5 may be of circular outline and of equal diameter. Preferably the S poles of the permanent magnets 1 and 2 are secured to the intermediate plate 3 which forms a common S pole at the outer edge while the two outer plates 4 and 5 are secured to or in contact with the N poles of the two permanent magnets 1, 2 so that an N pole is formed at the outer edge of each of the plates 4 and 5. Accordingly, the magnetic lines of force of the S pole or intermediate plate 3 are twice as numerous or strong as the magnetic lines of force from the two N poles or outer plates 4 and 5. Preferably the intermediate plate 3 is made thicker than the outer plates to accommodate the magnetic fields of the two permanent magnets 1 and 2. This arrangement permits the provision of a magnetic field which is twice as strong and which is centered toward the middle of the outer magnet system. This effect already is advantageous. However, the magnetic field is still developed between the outer edges of the system across two air gaps with the resulting well known drawbacks. Furthermore, the detrimental, uncontrollable stray magnetic fields at the outer surface of the magnetic system have not been avoided.

If the diameter of the intermediate plate 3 is increased beyond that of the outer plates 4 and 5 as shown in Fig. 6, the magnetic lines of force from the periphery of the enlarged intermediate plate 3 become less numerous or weaker. However, the magnetism of the outer plates 4 and 5 remains the same. The detrimental uncontrollable magnetic fields have not disappeared. If the diameter of the intermediate plate 3 is further increased, the lines of force from the S pole or intermediate plate 3 becomes less and less until they are zero as shown in Fig. 7. The lines of force from the N pole or outer plates 4 and 5, however, remain substantially at the same high value.

This unexpected magnetic effect is novel and has not previously been described. This novel effect is of no practical importance for the purpose of the invention but serves to clarify the magnetic theory developed in accordance with the invention.

Figure 8:
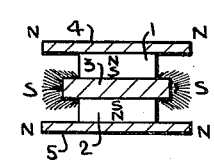
Figure 9:
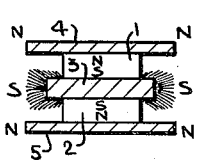
Figure 10:
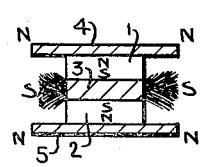
Figure 11:
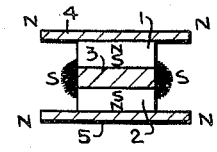
Figure 12:
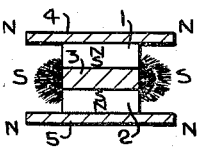

However, if the intermediate plate 3 is reduced in diameter toward the interior of the magnetic system as shown in Fig. 8, the magnetic lines of force of the S pole along the periphery of the intermediate plate 3 are increased in direct ratio to the reduction of the diameter. On the other hand, the lines of force from the N poles of the outer plates 4 and 5 disappear gradually. If the S pole or intermediate plate 3 is further reduced in diameter, Fig. 9, a further increase of its lines of force takes place while the lines of force from the outer plates are reduced to zero. The outer plates 4 and 5 have thus become substantially non-magnetic because no magnetic lines of force originate therefrom. Consequently, uncontrollable stray fields at the outer surfaces of the outer plates are no longer present. The reduction of the diameter of the intermediate plate 3 may be continued until its diameter equals that of the permanent magnets 1 and 2 as illustrated in Fig. 10. This unexpected magnetic effect has not previously been described and is of great importance for the purpose of the invention. It serves as the basis for the magnet system of the invention for attracting and collecting ferromagnetic particles.

The device of the invention when arranged to separate and attract ferromagnetic particles from a fluid medium operates as follows. The particles are first attracted by the inner magnetic field of the system to the points having the largest number of magnetic lines of force between the mid-portion of permanent magnet 1 and that of permanent magnet 2, Fig. 11. The ferromagnetic particles are strongly attracted to these points; gradually a thicker layer builds up (Fig. 12) until the particles assume the shape of Fig. 13 in accordance with the above described magnet theory. The attracted ferromagnetic particles have the tendency, as the filter process proceeds, to orient themselves in the interior of the system toward the outer plates 4, 5 where they slowly form a magnetic short circuit. As the filtering process proceeds further the stronger center field gradually builds up again and again the particles orient themselves towards the outer plates.

Figure 13:
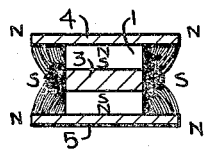
Figure 14:
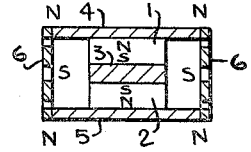
Figure 15:
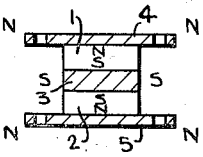

This process continues until the entire space limited by the outer plates is filled with ferromagnetic particles, Fig. 13. This space should be made as large as possible. The magnetic system is short-circuited after this collector space is filled with ferromagnetic particles. This mode of operation of the magnetic system of the invention may be called a strong magnetic suction effect. The collected ferromagnetic particles are strongly attracted by the magnetic circuit but do not form magnetic stray fields which project into the flowing medium and therefore bulge-like or beard-like accumulations of ferromagnetic particles which may easily be swept away, are not formed. The outer plates 4, 5 may have the shape of a hollow semi-sphere as shown at 12, 13 in Figs. 3, 4. The operation is the same. Furthermore, the outer plates may have outwardly bent or flared edges, as shown in Fig. 2, so that a further increase of the collector space for the ferromagnetic particles to be attracted is obtained. However, the outer plates may also be inwardly tapered. Furthermore, it is feasible to cover the magnet system which is open on all sides by a cylindrical, perforated diamagnetic cover 6 of sheet material which will pass the ferromagnetic particles and which may be secured to the outer plates 4, 5 as shown in Fig. 14. It is also feasible to arrange several magnet systems in accordance with the invention. For example, the systems may be disposed in a suitable filter housing or they may be used as a filter for circulating oil.

Alternatively, such magnet systems in accordance with the invention may be fixed to the screws used for draining oil from gear housings, oil containers and the like. In this case the magnet system may be secured to the screw or may be disposed within a suitable bore of the screw. To this end the embodiment of Fig. 15 may be used with advantage where plates 4, 5 are provided with suitable openings for holding screws.

The invention has been described with reference to a preferred embodiment and it will be understood that many variations and modifications thereof may be resorted to without departure from the scope of the invention as defined in the following claims.

I claim:

1. A magnet system for attracting magnetizable particles contained in a freely-flowing medium comprising a pair of permanent magnets, each having a north and a south pole, two outer plates of soft magnetic material spaced from each other, and an intermediate plate of soft magnetic material disposed between said outer plates and spaced therefrom, said intermediate plate being disposed between and in contact with identical poles of said magnets, each of said outer plates being in contact with the remaining pole of a magnet, said outer plates extending throughout their contour beyond said intermediate plate and said magnets to form a free, substantially unobstructed space between said outer plates, said intermediate plate and said magnets, whereby substantially no magnetic lines of force originate from the outer surfaces of said outer plates while the magnetic field from said intermediate plate is very strong.

2. A system as defined in claim 1 wherein said intermediate plate does not extend beyond said magnets.

3. A system as defined in claim 1 wherein each of said outer plates is of semi-cylindrical shape.

4. A system as defined in claim 1 wherein said outer plates are outwardly flared beyond said magnets.

5. A system as defined in claim 1 wherein a perforated cover of diamagnetic material is disposed between the contours of said outer plates interconnecting the same to form a collector space between said cover, said outer plates and said magnets.

6. A magnet system for attracting ferromagnetic particles contained in a freely-flowing medium comprising a pair of magnets, each having a south pole and a north pole, an intermediate plate and a pair of outer plates of soft magnetic material, said outer plates being disposed oppositely of said intermediate plate and spaced therefrom, said intermediate plate being disposed between and in contact with like poles of said magnets, each of said outer plates being disposed adjacent and in contact with the other pole of a magnet, said intermediate plate being throughout disposed within, and having a contour inwardly recessed from, the orbit of the outer edges of said outer plates to provide a space normally free from paramagnetic materials between said outer plate and the edges of said intermediate plates and said magnets, whereby a strong magnetic field is developed within said outer plates and adjacent said magnets which will strongly attract said particles while stray fields originating from the outer surfaces of said outer plates are substantially avoided.

7. A magnet system for attracting ferromagnetic particles contained in a freely-flowing medium comprising a pair of magnets, each having a south pole and a north pole, an intermediate plate and a pair of outer plates of soft magnetic material, said outer plates being disposed oppositely of said intermediate plate and spaced therefrom, said intermediate plate being disposed between and in contact with the south poles of said magnets, each of said outer plates being disposed adjacent and in contact with the north pole of a magnet, said plates being of circular outline, said intermediate plate being flush with said magnets and disposed within the outer edges of said outer plates to provide an unobstructed space between said outer plates and the edges of said intermediate plate and said magnets, whereby a strong magnetic field is developed within said outer plates and adjacent said magnets which will strongly attract said particles while stray fields originating from the outer surfaces and from the edges of said outer plates are substantially avoided.

HEINRICH SPODIG.

REFERENCES CITED

The following references are of record in the file of this patent:

UNITED STATES PATENTS

| Number | Name | Date |
| --- | --- | --- |
| 2,503,173 | Reisner | Apr. 4, 1950 |

FOREIGN PATENTS

| Number | Country | Date |
| --- | --- | --- |
| 62,534 | Denmark | Aug. 7, 1944 |